United States Patent
Adachi

(10) Patent No.: US 10,477,056 B2
(45) Date of Patent: Nov. 12, 2019

(54) IMAGE READING APPARATUS AND IMAGE FORMING APPARATUS

(71) Applicant: CANON KABUSHIKI KAISHA, Tokyo (JP)

(72) Inventor: Seiichiro Adachi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/878,079

(22) Filed: Jan. 23, 2018

(65) Prior Publication Data

US 2018/0220012 A1   Aug. 2, 2018

(30) Foreign Application Priority Data

Jan. 30, 2017   (JP) .................... 2017-014383

(51) Int. Cl.
   *H04N 1/00*   (2006.01)

(52) U.S. Cl.
   CPC ....... *H04N 1/0083* (2013.01); *H04N 1/00798* (2013.01); *H04N 2201/0049* (2013.01); *H04N 2201/0081* (2013.01)

(58) Field of Classification Search
   CPC ............. H04N 1/00798; H04N 1/0083; H04N 2201/0049; H04N 2201/0081
   USPC .................. 358/474, 498, 497, 496
   See application file for complete search history.

(56) References Cited

U.S. PATENT DOCUMENTS

| 5,961,110 A * | 10/1999 | Adachi ................. B65H 39/11 270/58.01 |
| 6,268,909 B1* | 7/2001 | Honmochi ............ B65H 45/18 355/25 |
| 7,891,647 B2* | 2/2011 | Nakane .................... B42C 1/12 270/10 |
| 8,913,309 B2* | 12/2014 | Adachi ............. H04N 1/00602 271/3.14 |
| 8,953,230 B2* | 2/2015 | Adachi ............. H04N 1/00588 271/10.01 |
| 10,183,824 B2* | 1/2019 | Adachi .................... B65H 1/04 |
| 2003/0197900 A1* | 10/2003 | Hiromatsu ........... H04N 1/0083 358/474 |
| 2009/0206540 A1* | 8/2009 | Adachi .................. B65H 33/04 271/9.13 |

(Continued)

FOREIGN PATENT DOCUMENTS

| JP | 2006-058401 | 3/2006 |
| JP | 5264215 B1 | 8/2013 |

*Primary Examiner* — Negussie Worku
(74) *Attorney, Agent, or Firm* — Venable LLP

(57) ABSTRACT

An image reading apparatus includes: an optical unit movably provided to a device main body; a flexible flat cable connected to the optical unit and to the device main body through a curved portion; a first friction surface on which the flexible flat cable abuts on an opposing surface of the device main body opposing the optical unit; and a second friction surface having a frictional force smaller than that of the first friction surface on which the flexible flat cable abuts on the opposing surface, wherein when the optical unit is positioned at an end portion on one side in a moving direction, the flexible flat cable abuts on the first friction surface, and the flexible flat cable further abuts on the second friction surface on a side where the curved portion is formed outside of the first friction surface in the moving direction of the optical unit.

11 Claims, 9 Drawing Sheets

(56) References Cited

U.S. PATENT DOCUMENTS

| | | | |
|---|---|---|---|
| 2010/0053678 A1* | 3/2010 | Yoshihisa | H04N 1/00519 358/1.15 |
| 2011/0211234 A1* | 9/2011 | Kozaki | H04N 1/00559 358/474 |
| 2011/0235140 A1* | 9/2011 | Ito | G03G 15/605 358/498 |
| 2012/0026558 A1* | 2/2012 | Fujiwara | H04N 1/0083 358/474 |
| 2013/0321885 A1* | 12/2013 | Adachi | H04N 1/00588 358/498 |
| 2013/0321886 A1* | 12/2013 | Adachi | H04N 1/00602 358/498 |
| 2017/0094094 A1* | 3/2017 | Tanaka | H04N 1/1043 |
| 2018/0176395 A1* | 6/2018 | Tokonami | H04N 1/0083 |

\* cited by examiner

IMAGE READING APPARATUS AND IMAGE FORMING APPARATUS

BACKGROUND OF THE INVENTION

Field of the Invention

The present invention relates to an image reading apparatus such as a copying machine, a facsimile machine, and an image scanner and relates to an image forming apparatus provided therewith.

Description of the Related Art

As illustrated in FIG. 9, in a conventional image reading apparatus configured to scan an original D placed on an original base plate with a reading optical unit 1001, the reading optical unit 1001 is connected to the image reading apparatus through a flexible flat cable 1002 (Japanese Patent No. 5264215). Hereinafter, the flexible flat cable is referred to as the FFC. In such image reading apparatus, the FFC 1002 is disposed between an area S through which the reading optical unit 1001 passes while scanning the original D and a bottom plate 1003 of the image reading apparatus. The FFC 1002 is connected to the reading optical unit 1001 at one end thereof and is connected to a fixing portion 1004, which is in the vicinity of the bottom plate 1003 of the image reading apparatus, at the other end thereof.

In the related art, however, in scanning of the original, when the reading optical unit scans in a direction of approaching a connected position in the vicinity of the bottom plate, a slack is caused in the FFC due to the FFC being shifted in a moving direction relative to the bottom plate. Then, the slack in the FFC is uplifted from the bottom plate and is pinched between the reading optical unit and the bottom plate. This may hinder the reading optical unit from scanning normally or may cause damage to the FFC.

Accordingly, there is an image reading apparatus having a configuration in which a high friction sheet is attached to the bottom plate so as to prevent the FFC from being shifted relative to the bottom plate. However, since the high friction sheet is attached to the bottom plate so as to prevent the FFC from being shifted, when the reading optical unit scans in a direction of decreasing a diameter of a curved portion formed by the FFC, in a case where each of the fixing portion with the bottom plate and the fixing portion with the reading optical unit of the FFC is shifted in a direction not parallel to a scanning direction of the reading optical unit, the diameter of the curved portion formed by the FFC may be different in a width direction of the FFC between one end side and the other end side thereof. In a case where the diameter of the curved portion becomes smaller than an anticipated diameter, a load applied to the FFC becomes large, whereby in general, it leads to a failure such as disconnection.

SUMMARY OF THE INVENTION

It is desirable to prevent the disconnection due to the diameter of the curved portion of the flexible flat cable becoming small as well as to prevent a failure such as uplifting of the flexible flat cable and riding of an image reading portion thereon.

In order to achieve the above, an embodiment of the present invention includes: a device main body; an optical unit movably provided in the device main body and having a light source configured to irradiate an original with light to read an image on the original; a flexible flat cable connected to the optical unit at one end thereof and connected to the device main body at the other end thereof and provided to be deformable accompanying movement of the optical unit, the flexible flat cable having a curved portion formed between the one end thereof and the other end thereof; a first friction surface on which the flexible flat cable abuts on an opposing surface which is a surface of the device main body opposing the optical unit; and a second friction surface having a frictional force smaller than that of the first friction surface on which the flexible flat cable abuts on the opposing surface, wherein the second friction surface is disposed near the curved portion than the first friction surface in the moving direction, wherein in a case where the optical unit is positioned at an end portion on one side in a moving direction, the flexible flat cable abuts on the first friction surface and the second friction surface.

According to an embodiment of the present invention, it is possible to prevent the disconnection due to the diameter of the curved portion of the flexible flat cable becoming small as well as to prevent the failure such as the uplifting of the flexible flat cable and the riding of the optical unit on the flexible flat cable.

Further features of the present invention will become apparent from the following description of exemplary embodiments with reference to the attached drawings.

DESCRIPTION OF THE EMBODIMENTS

Hereinafter, exemplary embodiments of the present invention are described in detail with reference to the attached drawings. Note, however, that dimensions, materials, and shapes of components described in the embodiments below as well as relative positions thereof and the like are to be appropriately changed according to a configuration of a device to which the present invention is applied and various conditions, and the scope of the present invention is not intended to be limited only thereto.

First Embodiment

Figure 1:
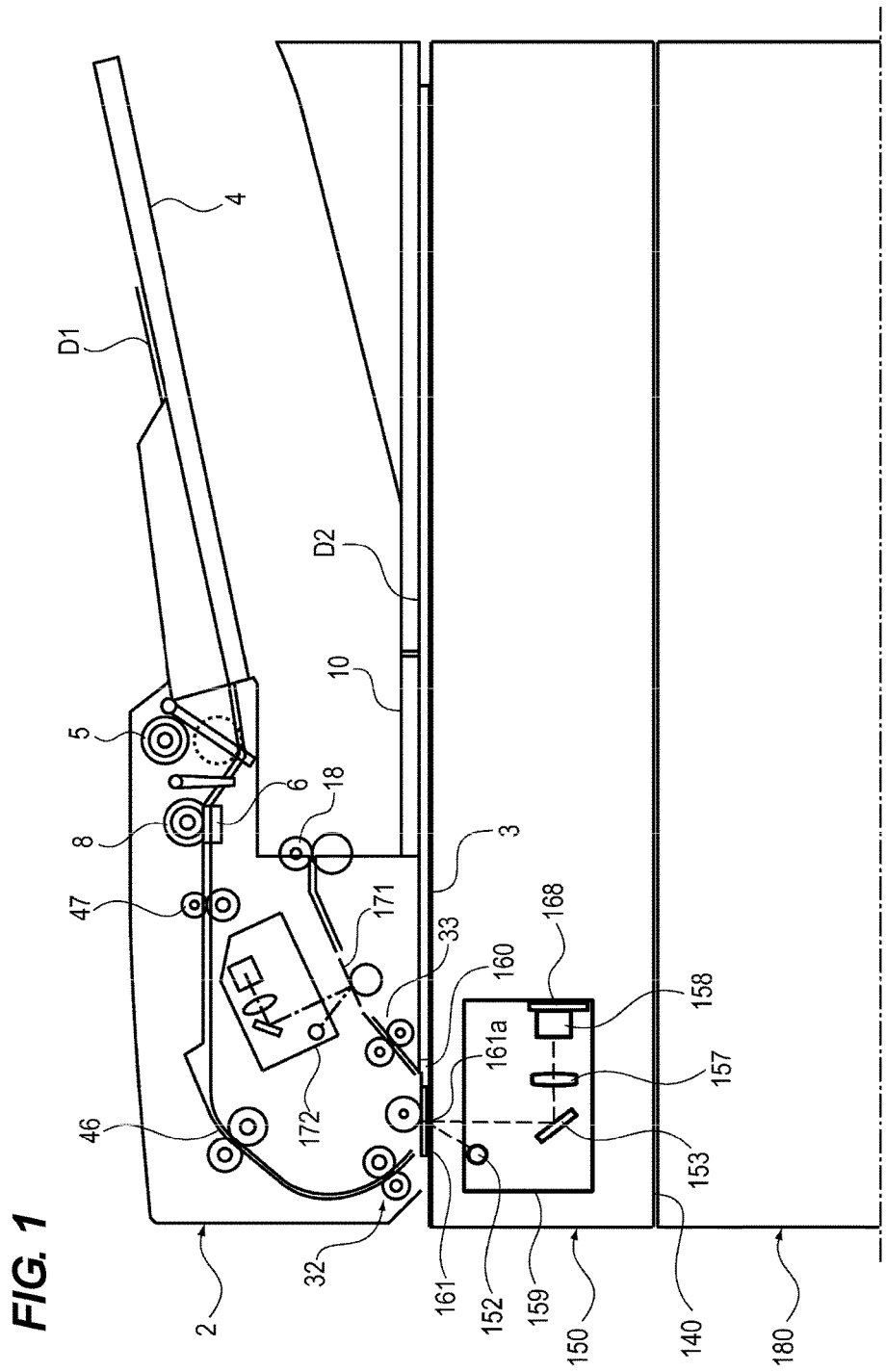
FIG. 1 is a schematic front sectional view of an original reading apparatus according to a first embodiment.
Figure 2:
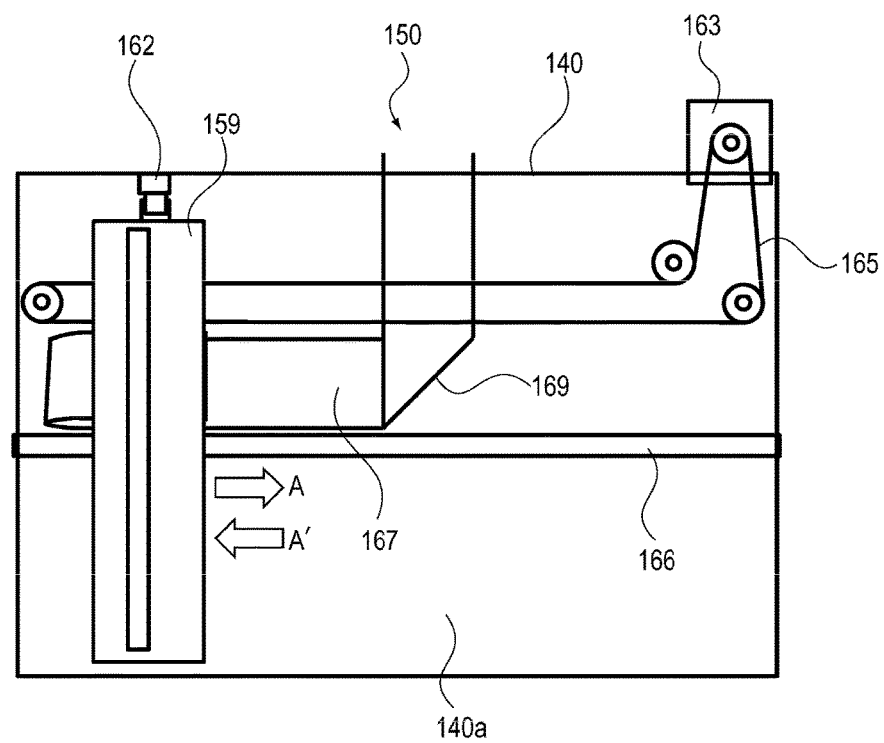
FIG. 2 is a schematic top sectional view of the original reading apparatus according to the first embodiment.
Figure 3A:
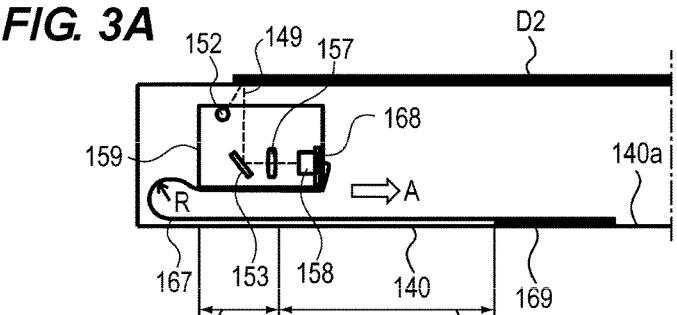
FIGS. 3A to 3E are schematic front sectional views of the original reading apparatus according to the first embodiment.
Figure 3B:
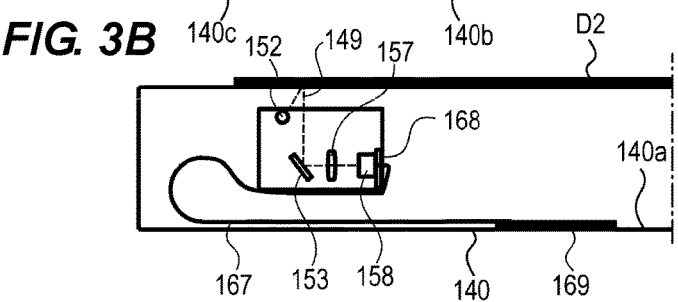
Figure 3C:
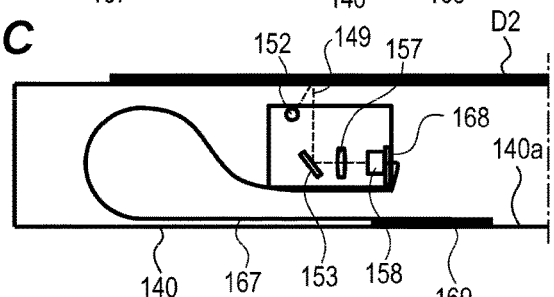
Figure 3D:
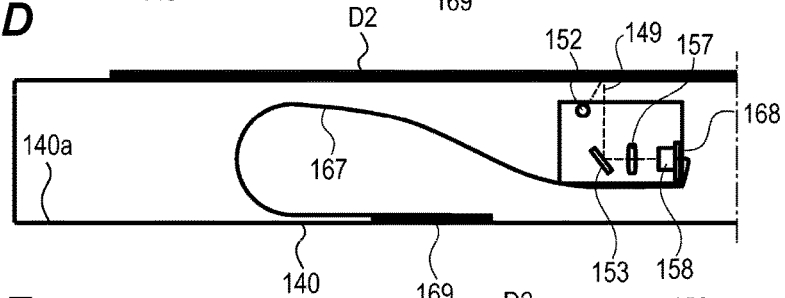
Figure 3E:
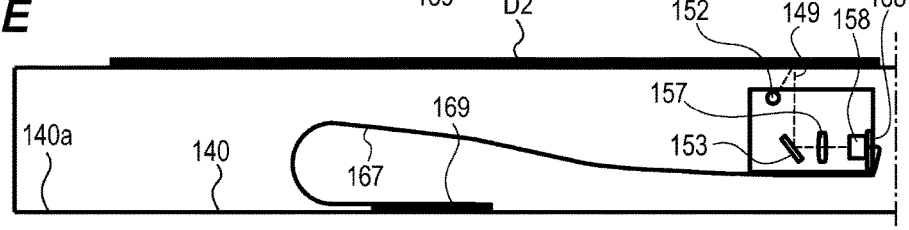
Figure 4:
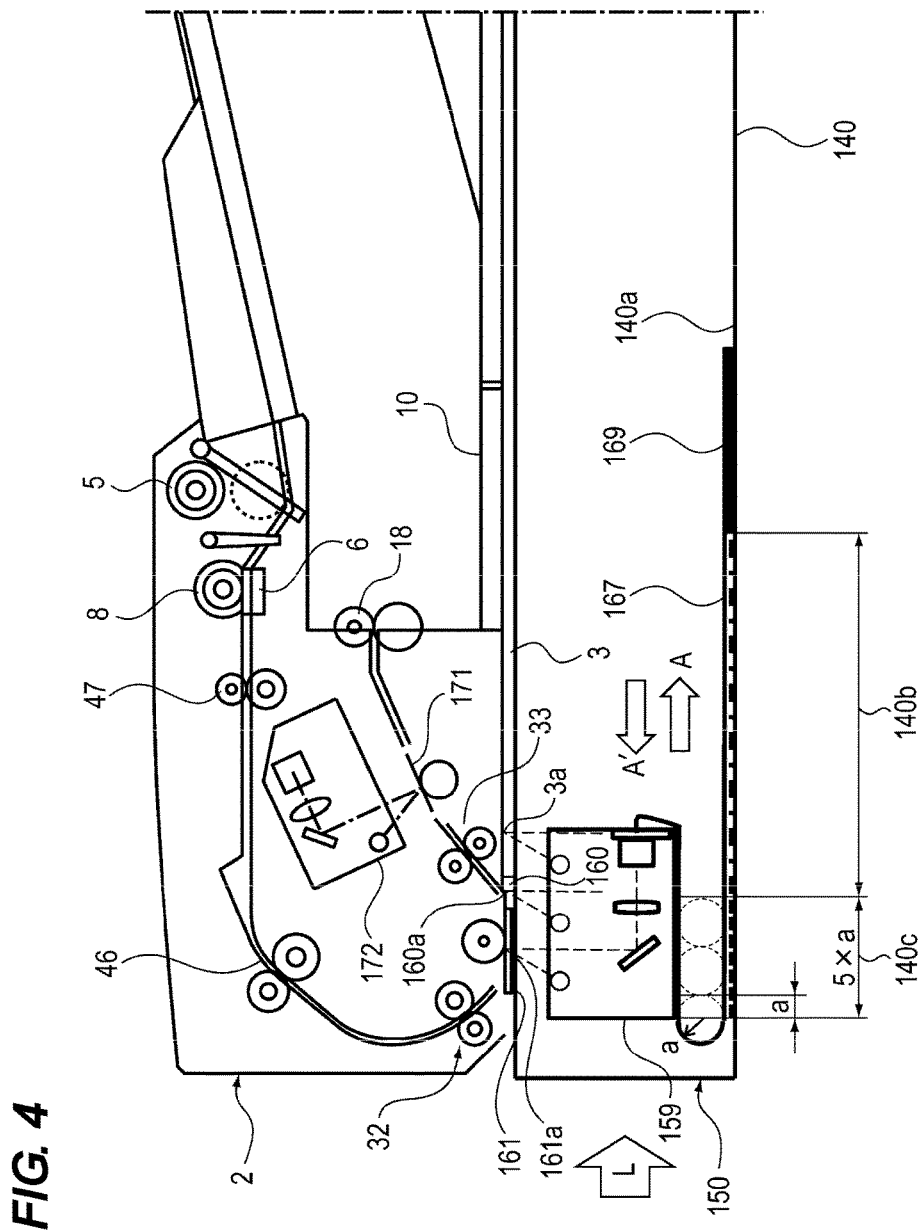
FIG. 4 is a schematic front sectional view of the original reading apparatus according to the first embodiment.
Figure 5:
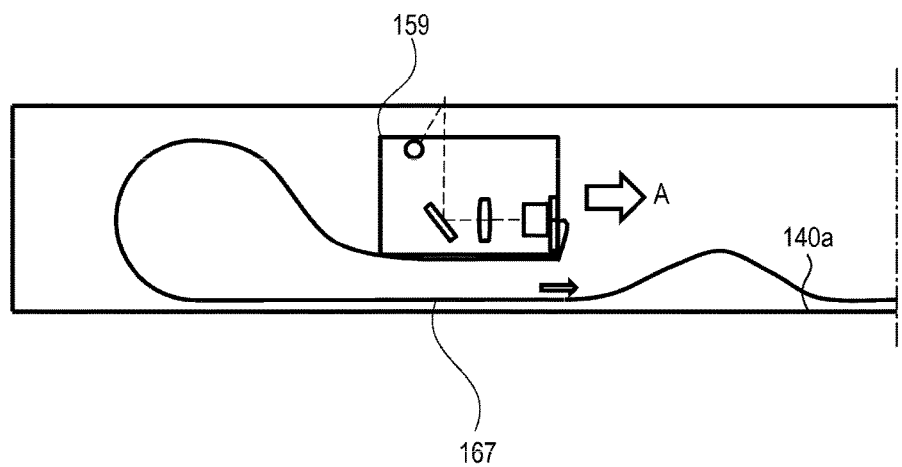
FIG. 5 is a schematic front sectional view of an original reading apparatus according to a comparative example.
Figure 6A:
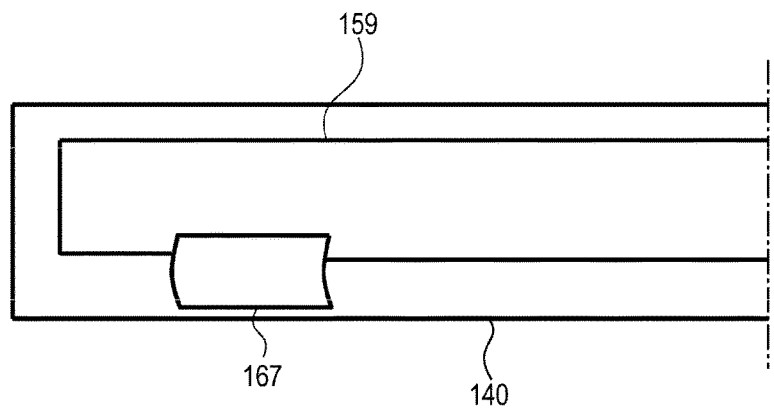
FIGS. 6A and 6B are schematic left-side sectional views of the original reading apparatus according to the first embodiment.
Figure 6B:
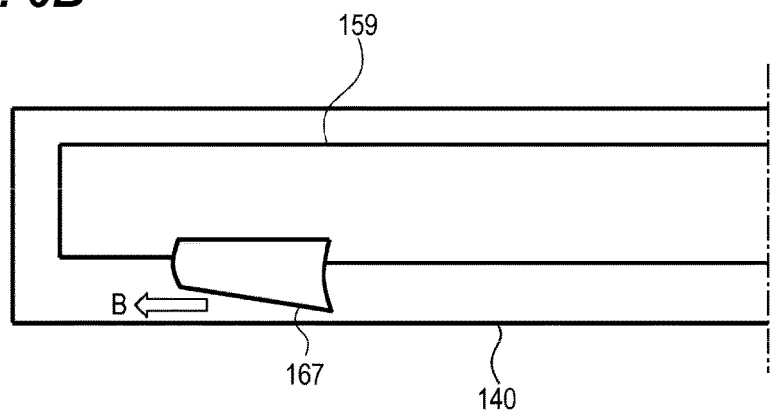
Figure 7:
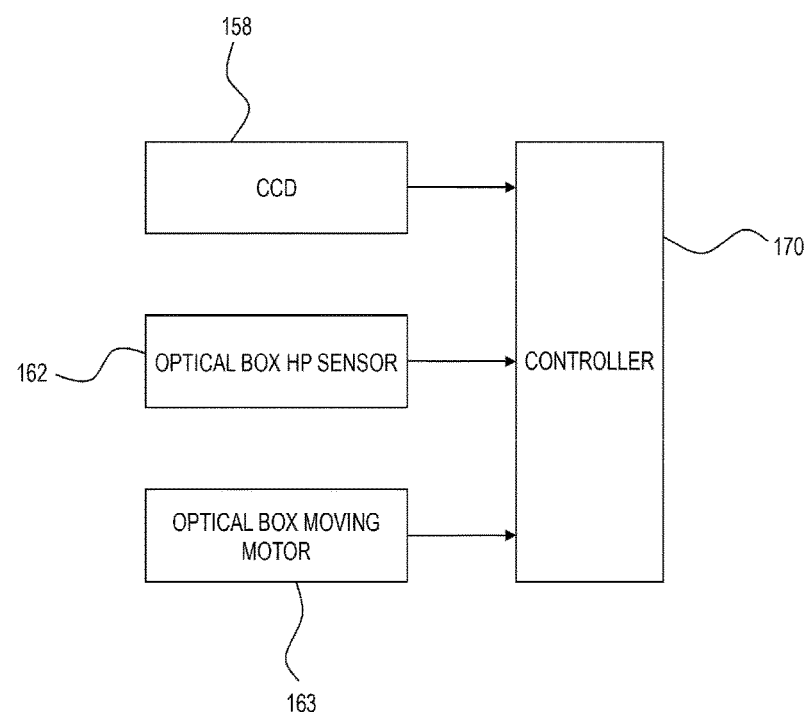
FIG. 7 is a block diagram of the original reading apparatus according to the first embodiment.

Hereinafter, an original reading apparatus according to a first embodiment is described with reference to FIGS. 1 to 7. FIG. 1 is a front sectional view illustrating a schematic configuration of the original reading apparatus according to the first embodiment. FIG. 2 is a schematic top sectional view of an image reading apparatus according to the first embodiment. FIGS. 3A to 3E are schematic front sectional views of the image reading apparatus according to the first embodiment and are views illustrating a relationship between movement of an optical box and deformation of a flexible flat cable (FFC). FIG. 4 is a schematic front sectional view of the image reading apparatus according to the first embodiment. FIG. 5 is a schematic sectional view illustrating uplifting of an FFC in an image reading apparatus according to a comparative example. FIGS. 6A and 6B are schematic left-side sectional views of the image reading apparatus according to the first embodiment. FIG. 7 is a block diagram of the image reading apparatus according to the first embodiment.

As illustrated in FIG. 1, the original reading apparatus includes an image reading apparatus (hereinafter, referred to as a reader portion) 150, and an auto document feeder (hereinafter, referred to as an ADF) 2. The reader portion 150 reads an image on a sheet to be read (hereinafter, referred to as an original) on which the image is formed. The ADF 2 supplies the original to the reader portion 150 and reads one surface of the original with an original reading portion provided thereto. Hereinafter, a detailed description is given.

[Reader Portion]

As illustrated in FIG. 1, the reader portion 150 includes a lamp 152 that irradiates an image surface of the original with light, a mirror 153 that guides reflected light from the original being irradiated by the lamp 152 to a lens 157, a charge coupled device (hereinafter, referred to as CCD) 158, and the like. Each of constituent elements of the reader portion 150 is housed in a reader frame 140 having an original base plate glass arranged on an upper surface thereof.

The lamp 152, the mirror 153, the lens 157, and the CCD 158 are installed in an optical box (reading portion) 159. The optical box 159, in which the lamp 152, the mirror 153, the lens 157, and the CCD 158 are installed, constitutes an image reading portion (reading optical unit) that reads an image on the original, and the optical box 159 is movably provided in the reader frame 140, which is a device main body. As illustrated in FIG. 2, the optical box 159 is coupled to an optical box moving motor 163 through a timing belt 165. The optical box moving motor 163 is controlled by a controller 170 and is rotated in a forward direction using a position of an optical box HP sensor 162, which detects a home position (initial position) of the optical box 159, as a reference to move the optical box 159 along a rail 166 from an end portion on one side in a moving direction to a direction of an arrow A. Once the optical box 159 is moved to a right end in the drawing (end portion on the other side in the moving direction), the optical box moving motor 163 is reversed to move the optical box in a direction of returning to the initial position. In this way, the optical box 159 illustrated in FIG. 1 optically scans an original D2 placed on an original base plate glass 3.

As illustrated in FIGS. 3A to 3E, reflected light 149 from the original obtained as a result of scanning of the original D2 by the optical box 159 is guided to the lens 157 by the mirror 153 and is condensed on the CCD 158 by the lens 157. The CCD 158 photoelectrically converts the reflected light 149, which reflects image information of the original, and outputs it to the controller 170 as an electronic image signal through a CCD substrate 168 to which the CCD 158 is connected and through a flexible flat cable (hereinafter, referred to as the FFC) 167. The FFC 167 is connected to the CCD substrate 168 at one end thereof. The FFC 167 passes below a lower surface of the optical box 159 illustrated in FIG. 3A and once extends to the left side of the optical box 159. Then, the FFC 167 is reversed forming an arc R, which is a curved portion, and again passes below the lower surface of the optical box 159, and is connected to a bottom surface 140a of the reader frame 140 at a FFC fixing portion 169 in the vicinity of a middle of a scanning width. As illustrated in FIG. 2, here, the FFC 167 is folded back at the fixing portion 169 and is redirected and connected in a direction of the controller, which is upward in the drawing. That is, the FFC 167 is connected to the image reading portion (optical box) at one end thereof and is connected to the device main body (reader frame) at the other end thereof through the curved portion (arc R).

The FFC 167 has a width in a direction orthogonal to a scanning direction and in a direction parallel to the bottom surface (an opposing surface opposing a lower surface of the FFC) of the reader frame 140. In FIG. 3A, in an image reading operation of the original, when the optical box 159 scans in a right direction (direction of the arrow A) in the drawing, the FFC 167 moves to one side (left side) of the optical box 159 while forming the arc R. When the optical box moves in a direction of approaching the FFC fixing portion 169 on the bottom surface of the reader frame, the arc R becomes large as illustrated in FIGS. 3B and 3C, and when the optical box moves in a direction of moving away from the FFC fixing portion 169, as illustrated in FIGS. 3D and 3E, the arc R is formed on the left side of the FFC fixing portion 169, and a size thereof is decreased. That is, as illustrated in FIG. 3A, the arc R becomes the minimum when the optical box 159 moves to a movement limit position in a left direction (one side in the moving direction) in the drawing, and the arc R becomes the maximum when the optical box 159 moves to upward of the FFC fixing portion 169 in a substantially central portion of a scanning area, as illustrated in FIG. 3D. When the optical box 159 moves further from a position illustrated in FIG. 3D to the right side, the FFC 167 forms the arc R in the vicinity of the fixing portion 169 on the bottom surface of the reader frame 140, and when the optical box 159 moves to a right end, the arc R becomes the minimum. In this way, the FFC 167 is provided so as to be deformable accompanying movement of the optical box 159. Further, in the image reading operation of the original, the optical box 159 scans a predetermined area, which is an area between an end portion (movement limit position) on one side in the moving direction illustrated in FIG. 3A, and an end portion (movement limit position) on the other side in the moving direction in directions of the arrow A and an arrow A' illustrated in FIG. 2. Note, however, that as described later, as illustrated in FIG. 3A, a first friction surface 140b and a second friction surface 140c having a lower frictional force than that of the first friction surface 140b are provided in part of the frame bottom surface 140a abutting on the FFC 167.

[ADF (Auto Document Feeder)]

As illustrated in FIG. 1, the ADF 2 is provided with an original tray 4 on which an original D1 is placed. A bundle of originals, which is constituted of a plurality of sheets of the originals placed on the original tray 4, is fed out by a pickup roller 5. Here, in a case where the plurality of sheets of the originals is fed out, the sheets are separated one by one by separation portions 6 and 8. Each of the originals that have been separated is conveyed in a conveying path by a pair of conveying rollers 46 and 47.

The original that has been conveyed is sent to a reading position 161a on a platen glass 161 by a pair of read rollers 32. While being conveyed, an image on a front surface of the original is read at the reading position 161a by the optical box 159 provided in the reader portion 150. After the image on the front surface thereof has been read, the original is sent to a back surface original base plate glass 171 by a pair of second read rollers 33, and an image on a back surface thereof is read by a back surface optical box 172 provided in the ADF 2. After the image on the back surface thereof has been read, the original is discharged onto a discharge tray 10 by a pair of original discharge rollers 18. That is, the ADF 2 has a configuration in which the optical box is connected at a reading position and the image is scanned by conveying the original so as to pass the reading position.

The reader portion 150 reads the original either by a fixed reading mode (original base plate glass original reading mode) or by a flow reading mode (ADF original reading mode) selected by a user. The fixed reading mode is a mode of reading the image of the original by placing the original on the original base plate glass 3 and by moving the optical box 159 in a sub-scanning direction (direction of the arrow A in FIG. 1) to scan. On the other hand, the flow reading mode is a mode of reading the image of the original by fixing the optical box 159 at a position where the image can be read at the reading position 161a on the platen (platen) glass 161 and by conveying the original so as to pass the reading position 161a.

[Operation of Optical Box]

An operation of the optical box is described herein.

Initially, the optical box 159 stands by at a position 160a that is on one side (in the direction of the arrow A in FIG. 4) of the reading position (position illustrated in FIG. 4) 161a in reading in the flow reading mode and that is on the other side (in the direction of an arrow A' in FIG. 4) of a position 3a where reading is started in the fixed reading mode. A standby position that is positioned between the reading position 161a in the flow reading mode and the reading start position 3a in the fixed reading mode becomes the initial position 160a of the optical box 159 as the image reading portion. The initial position 160a of the optical box 159 is positioned to a white reference 160 to be a reading reference provided between the platen glass 161 and the original base plate glass 3. The optical box 159 stands by at the initial position (home position) 160a, and when the user selects either the flow reading mode or the fixed reading mode, the optical box 159 is capable of promptly starting scanning by moving the shortest distance.

Here, when the flow reading mode is selected, as illustrated in FIG. 4, the optical box 159 moves from the initial position 160a to one side in the moving direction (direction of the arrow A' in FIG. 4) so as to be fixed in the reading position 161a, and stands by until the original is conveyed from the ADF 2. On the other hand, in the fixed reading mode, the optical box 159 moves from the initial position 160a to the other side in the moving direction (direction of the arrow A in FIG. 4), and reading is started after a moving velocity thereof is stabilized.

Here, when the optical box 159 moves from the initial position 160a in a direction of the fixing portion 169 (direction of the arrow A in FIG. 4), in some cases, a part of the bottom surface 140a of the reader frame 140, which is an opposing surface opposing the optical box 159, that abuts on the FFC 167 (part where the FFC is passed along the bottom surface) may move in a direction parallel to the bottom surface and in the moving direction of the optical box accompanying movement of the optical box. In such case, as illustrated in FIG. 5, the FFC 167 is uplifted from the bottom surface 140a between the optical box 159 and the fixing portion and forms a protruded shape. When the optical box 159 scans the image of the original, in a case where the protruded shape of the FFC 167 is large, the optical box 159 may collide therewith, causing abnormality in the image that has been read. Accordingly, in the part of the frame bottom surface 140a abutting on the FFC 167 indicated by an alternate long and short dash line in FIG. 4, there is provided the first friction surface 140b having a higher frictional force than that of the below-described second friction surface 140c. In the first friction surface 140b, by attaching a high friction sheet having a frictional force larger than that of the second friction surface 140c or by adding treatment to make surface roughness larger than that of the second friction surface 140c to the frame bottom surface 140a abutting on the FFC 167, a friction coefficient of the part of the frame bottom surface 140a abutting on the FFC 167 is made larger than that of the second friction surface so as to prevent the FFC 167 from moving in the direction parallel to the frame bottom surface 140a while the optical box 159 is scanning. As long as the FFC 167 is not moved in the direction parallel to the frame bottom surface 140a, the protruded shape is not formed in the FFC 167, whereby the optical box 159 can perform stable scanning.

On the other hand, in the present embodiment, as illustrated in FIG. 4, in an area in the vicinity of one end portion of a moving area of the optical box 159, in the part of the frame bottom surface 140a abutting on the FFC 167 indicated by a dotted line in FIG. 4, there is provided the second friction surface 140c having a lower frictional force than that of the first friction surface 140b. In the second friction surface 140c, by attaching a low friction sheet having a frictional force smaller than that of the first friction surface 140b to the frame bottom surface 140a abutting on the FFC 167, it is configured such that a friction coefficient of the part of the frame bottom surface 140a abutting on the FFC 167 is made smaller than that of the first friction surface 140b.

When the optical box 159 is positioned at the end portion on one side in the moving direction (here, the reading position in the flow reading mode illustrated in FIG. 4), the FFC 167 abuts on at least a part of the first friction surface 140b. Further, when the optical box 159 is positioned at the end portion on one side in the moving direction (here, the reading position in the flow reading mode illustrated in FIG. 4), the FFC 167 also abuts on at least a part of the second friction surface 140c on a side where the arc R is formed outside of the first friction surface 140b in the moving direction of the optical box 159 (opposite direction of the direction of the arrow A in FIG. 4).

When the optical box 159 moves toward the end portion on one side in the moving direction (moves in the direction of the arrow A' in FIG. 4), a radius (radius of curvature) of the arc R, which is the curved portion formed by the FFC 167 on a downstream side in the moving direction of the optical box 159, is reduced. When the optical box 159 is positioned at the end portion on one side in the moving direction within the moving area, the radius of the arc R becomes the minimum. The minimum diameter of the arc R is a distance equivalent to a distance between the optical box 159 and the frame bottom surface 140a.

Here, when the FFC 167 is viewed from the top, as illustrated in FIG. 2, in a case where a fixing position on a CCD side and a fixing position on a frame bottom surface side of the FFC 167 are shifted in a width direction (vertical direction in FIG. 2) orthogonal to the moving direction of the FFC (direction of the arrows A and A'), the arc R of the FFC 167 formed outside the optical box 159 has a radius that is non-uniform in the width direction. A state of such FFC is illustrated in FIG. 6B. FIG. 6B is a view illustrating the optical box 159 and the FFC 167 viewed from a direction of an arrow L in FIG. 4. In this state, when the optical box 159 is further moved in the direction of the arrow A' in FIG. 2 and the arc R of the FFC 167 becomes small, in the FFC 167, as indicated with an arrow B in FIG. 6B, a force to make the arc R uniform is generated due to rigidity of the FFC. This force is a force for moving the FFC 167 in the width direction. In a case where the FFC 167 cannot be moved even when this force is generated, a large load is applied to the FFC 167 on a smaller-radius side of the non-uniform radius, whereby a failure such as disconnection may be caused in some cases.

Therefore, in the present embodiment, as described above, when the optical box 159 is moved to one side in the moving direction (direction of the arrow A') in FIG. 2 or FIG. 4, it is configured such that a frictional force generated between the FFC 167 and the frame bottom surface 140*a* becomes small in the vicinity of the end portion on one side in the moving area. Accordingly, it does not hinder the force for moving the FFC 167 in the width direction, whereby the FFC 167 freely moves in the width direction, and as illustrated in FIG. 6A, the FFC 167 can form the arc R having the radius that is substantially uniform in the width direction.

Here, when a position at the end portion on one side in the moving area of the optical box 159 is a position at which the FFC 167 forms the arc R having a radius a, that is equivalent to a distance from the lower surface of the optical box 159 toward the frame bottom surface 140*a*. When the optical box 159 moves toward one side in the moving direction due to movement such as returning to the initial position, against a position at the end portion on one side in the moving direction of the optical box 159, a force of the FFC 167 that pushes the frame bottom surface 140*a* and a force of the FFC 167 that forms the uniform arc R are generated from the vicinity of a position of "5×a" that is about five times the radius a of the arc R (one half of the distance between the lower surface of the optical box and the frame bottom surface). Then, against the position at the end portion on one side in the moving direction of the optical box 159, in an area of one half of the distance between the lower surface of the optical box and the frame bottom surface, the force of the FFC 167 that pushes the frame bottom surface 140*a* becomes the maximum. Accordingly, as illustrated in FIG. 4, at least when the optical box 159 is located at the position at the end portion on one side in the moving direction (position at the left end portion), in an area a of the frame bottom surface 140*a* on which the FFC 167 abuts illustrated in FIG. 4, the frame bottom surface is configured such that a frictional force between the FFC 167 and the frame bottom surface 140*a* on which the FFC 167 abuts is smaller than that of the first friction surface. In any other area, the frame bottom surface is configured such that the frictional force between the FFC 167 and the frame bottom surface 140*a* on which the FFC 167 abuts is larger than that of the second friction surface.

Note that in the flow reading mode using the ADF 2, as described above, the optical box 159 moves from the initial position to one side in the moving direction, whereby the position at the end portion on one side in the moving direction in the moving area of the optical box 159 is a position equivalent to the reading position in the flow reading mode. Further, a position at the end portion on the other side in the moving direction is a position at which an original of the maximum size is read while being scanned, decelerated, and stopped in the fixed reading mode.

As described above, according to the present embodiment, in the vicinity of the end portion in the moving area of the optical box 159, in an area where the radius of the arc (curved portion) R of the FFC 167 becomes small, the friction coefficient between the FFC 167 and the frame bottom surface 140*a* on which the FFC 167 abuts is decreased. Further, in any other area, in a part where the FFC 167 abuts on the frame bottom surface 140*a*, the friction coefficient is increased. Thereby it is possible to prevent the disconnection due to the radius of the arc (curved portion) R of the FFC 167 becoming small as well as to prevent a failure such as riding of the optical box 159 on the FFC 167 due to uplifting of the FFC 167.

Other Embodiments

In the above-described embodiment, there is exemplified the configuration in which there is provided the second friction surface having the frictional force smaller than that of the first friction surface in the area of "5×a" (see FIG. 4) where the FFC starts to strongly push the frame bottom surface; however, it is not limited thereto. At least, in a case where the FFC and the frame bottom surface is in a low friction state in the area of "a" (see FIG. 4) where the force of the FFC that pushes the frame bottom surface becomes the maximum, the FFC moves, or so-called skids, in the width direction, whereby the minimum arc formed by the FFC becomes substantially uniform in the width direction. Further, the second friction surface is not limited to the area of "5×a" or the area of "a" and may be an area that is one half of the distance between the optical box and the frame bottom surface from the position at the end portion on one side in the moving direction toward the other side in the moving direction of the optical box.

As another embodiment, in a case where the entire frame bottom surface has a high friction coefficient relative to the FFC and a large frictional force is generated, it is also possible to make the FFC slippery by adding treatment such as polishing a surface of the frame bottom surface to make surface roughness smaller than that of the first friction surface to the area where the frictional force is to be made smaller (second friction surface). It is also possible to add low friction treatment such as fluorine coating treatment to the area where the frictional force is to be made smaller to make the FFC slippery. By using such configurations as well, it is possible to make the radius of the minimum arc formed by the FFC substantially uniform.

On the other hand, in a case where the entire frame bottom surface has a low friction coefficient relative to the FFC and a frictional force is small, in the area other than the area at the end portion on one side in the moving direction of the optical box (second friction surface), it is also possible to increase the frictional force by adding treatment to make the surface roughness of the frame bottom surface larger than that of the second friction surface.

Figure 8:
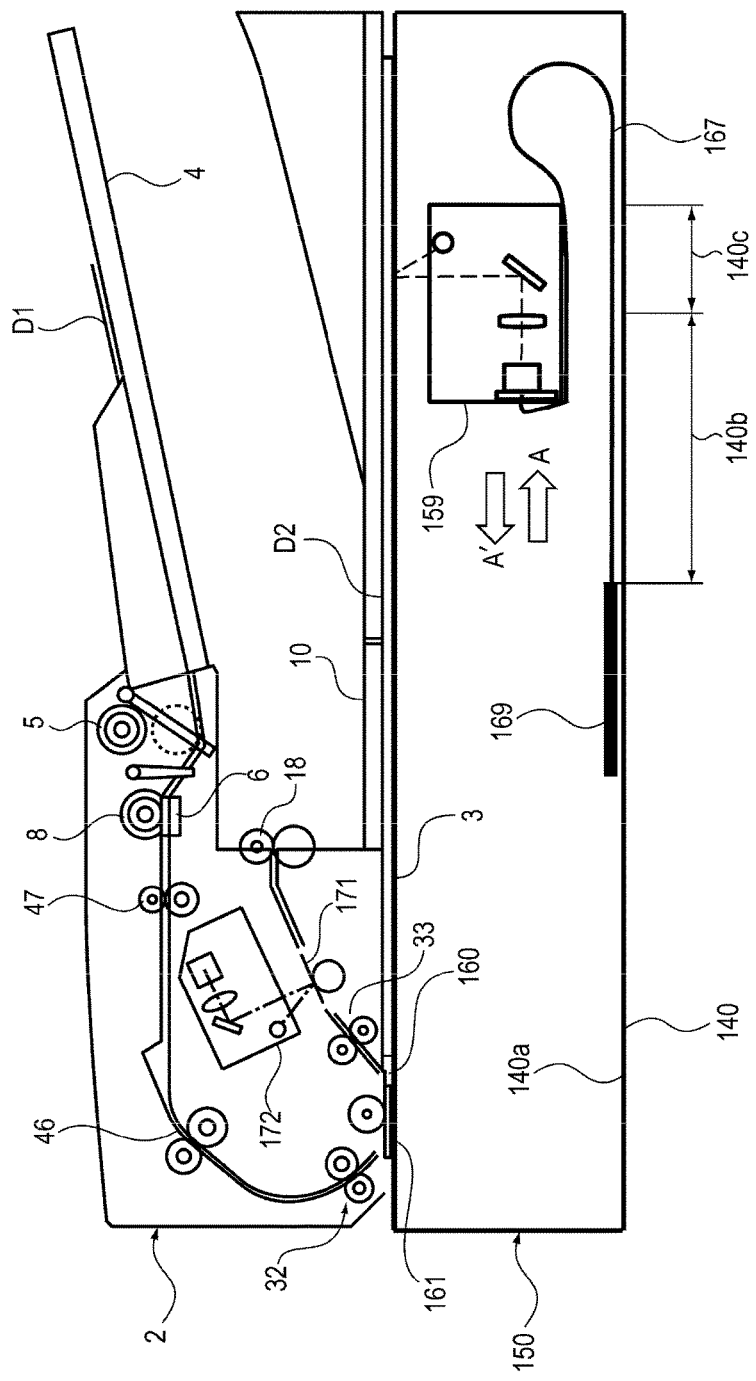
FIG. 8 is a schematic front sectional view of an original reading apparatus according to another embodiment.
Figure 9:
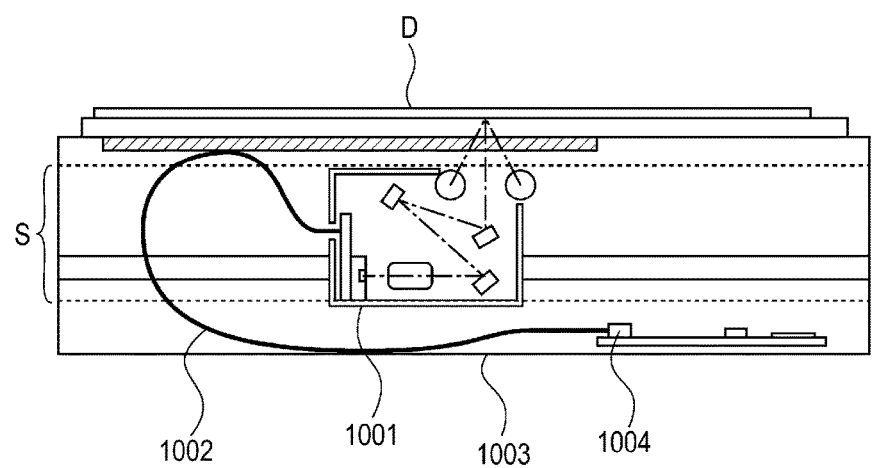
FIG. 9 is a schematic front sectional view of a conventional original reading apparatus.

In the above-described embodiment, there is described the example in which the radius of the arc (curved portion) formed by the FFC becomes smaller when the optical box moves toward the end portion on one side in the moving direction (direction of the arrow A'); however, the present invention is not limited thereto. For example, as illustrated in FIG. 8, in a configuration in which the radius of the arc (curved portion) formed by the FFC becomes smaller when the optical box moves toward the end portion on the other side in the moving direction (direction of the arrow A) as in a mirror image relationship with the above-described embodiment, the present invention is also effective in the same way as the embodiment described above. Specifically, it is configured such that in an area at the end portion on the other side in the moving direction (second friction surface 140*c*), the frictional force between the FFC 167 and the frame bottom surface 140*a* becomes smaller than that of the first friction surface 140*b*.

Further, in the above-described embodiment, there is exemplified the configuration in which the optical box moves from the initial position to the reading position in the flow reading mode; however, the present invention is not limited thereto. An image reading apparatus may also be configured to start scanning by setting the initial position (standby position) of the optical box to the position at the end portion on one side in the moving direction, the reading position in the flow reading mode to the initial position, and a scanning start position in the fixed reading mode to the initial position. In this case, at the initial position, in a position in the vicinity thereof on a lower surface side where the FFC abuts on the frame bottom surface, it is configured such that a friction coefficient becomes small.

In the above-described embodiment, as the optical unit, there is exemplified the optical box as the image reading portion that reads the image of the original; however, the present invention is not limited thereto. For example, an image reading apparatus may also be configured to include, at least, an optical unit provided to be movable relative to the device main body and having a light source that irradiates the image of the original with light. That is, it is also possible to obtain the same effect by applying the present invention to the image reading apparatus that scans an image surface of the original with the optical unit having the light source and that reads light reflected from the original by a reading sensor such as CCD and CMOS sensors through a mirror and a lens fixed to the device main body.

Further, in the above-described embodiment, there is exemplified the image reading apparatus provided with the auto document feeder; however, the present invention is not limited thereto. It may also be an image reading apparatus of an image forming apparatus 180 (see FIG. 1) having an image forming portion that forms an image on a sheet. As the image forming apparatus, there are an image forming apparatus such as a copying machine and a facsimile machine as well as an image forming apparatus such as a multifunction device in which such functions are combined. It is possible to obtain the same effect by applying the present invention to the image reading apparatus of such image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-014383, filed Jan. 30, 2017, which is hereby incorporated by reference herein in its entirety.

What is claimed is:

1. An image reading apparatus comprising:
    an original base plate glass on which an original is placed;
    an optical unit movably provided beneath the original base plate glass, and configured to read an image on an original placed on the original base plate glass as moving from an upstream side to a downstream side in a moving direction of the optical unit;
    an apparatus main body containing the optical unit;
    a flexible flat cable connected to the optical unit at one end thereof and connected to a controller at the other end thereof and provided to be deformable accompanying the movement of the optical unit, the flexible flat cable having a curved portion formed between the one end thereof and the other end thereof;
    a first friction member disposed on an inner bottom surface of the apparatus main body; and
    a second friction member disposed on the inner bottom surface of the apparatus main body at the upstream side of the first friction member in the moving direction of the optical unit, the second friction member having a frictional force smaller than that of the first friction surface wherein
    in a case where the optical unit is positioned at the upstream side end of in the moving direction, the flexible flat cable abuts on the first friction member and the second friction member.

2. The image reading apparatus according to claim 1, wherein
    the second friction member is an area one half of a distance between the optical unit and the inner bottom surface of the apparatus main body from a position at the end portion on one side in the moving direction toward the other side in the moving direction of the optical unit.

3. The image reading apparatus according to claim 2, wherein
    the position at an end portion on one side in the moving direction of the optical unit is a position of the optical unit at which a radius of curvature of the curved portion becomes the minimum, and the moving direction from the position at the end portion on one side toward the other side in the moving direction is a direction in which the curved portion becomes larger.

4. The image reading apparatus according to claim 1, wherein
    the second friction surface is a low friction sheet having a frictional force smaller than that of the first friction member.

5. The image reading apparatus according to claim 1, wherein
    on the second friction member, fluorine coating treatment is performed.

6. The image reading apparatus according to claim 1, wherein
    on the second friction member, treatment to make surface roughness smaller than that of the first friction member is performed to the inner bottom surface of the apparatus main body.

7. The image reading apparatus according to claim 1, wherein
    the first friction member is a high friction sheet having a frictional force larger than that of the second friction member.

8. The image reading apparatus according to claim 1, wherein
    on the first friction member, treatment to make surface roughness larger than that of the second friction member is performed.

9. The image reading apparatus according to claim 1, wherein
    the second friction member is at least a part of an area from an initial position of the optical unit to one side in the moving direction, and the first friction member is an area from the initial position of the optical unit to the other side in the moving direction.

10. The image reading apparatus according to claim 1, further comprising:
   a fixed reading mode configured to read an image of the original while moving the optical unit along the original placed on the original base plate glass; and
   a flow reading mode configured to read the image of the original by fixing the optical unit in a reading position and by conveying the original so as to pass the reading position.

11. An image forming apparatus comprising:
   an image forming portion configured to form an image on a sheet; and
   an image reading apparatus configured to read an image of an original, wherein
   the image reading apparatus includes:
   an original base plate glass on which an original is placed;
   an optical unit movably provided beneath the original base plate glass, and configured to read an image on an original mounted on the original base plate glass as moving from an upstream side to a downstream side in a moving direction of the optical unit;
   an apparatus main body containing the optical unit;
   a flexible flat cable connected to the optical unit at one end thereof and connected to a controller at the other end thereof and provided to be deformable accompanying the movement of the optical unit, the flexible flat cable having a curved portion formed between the one end thereof and the other end thereof,
   wherein the flexible flat cable elongates for an upstream side in the moving direction from an end of the optical unit, and turned and curved to form an arc for passing beneath the optical unit to be connected with the apparatus main body;
   a first friction member disposed on an inner bottom surface of the apparatus main body; and
   a second friction member disposed on the inner bottom surface of the apparatus main body at the upstream side of the first friction member in the moving direction of the optical unit, the second friction member having a frictional force smaller than that of the first friction surface,
   wherein in a case where the optical unit is positioned at an end of the upstream side in the moving direction, the flexible flat cable abuts on the first friction member and the second friction member.

\* \* \* \* \*